US009638237B2

(12) United States Patent
Yeh

(10) Patent No.: US 9,638,237 B2
(45) Date of Patent: May 2, 2017

(54) SNAP HOOK APPARATUS

(71) Applicant: Neng-Yuan Yeh, Taichung (TW)

(72) Inventor: Neng-Yuan Yeh, Taichung (TW)

( * ) Notice: Subject to any disclaimer, the term of this patent is extended or adjusted under 35 U.S.C. 154(b) by 154 days.

(21) Appl. No.: 14/736,714

(22) Filed: Jun. 11, 2015

(65) Prior Publication Data

US 2016/0363159 A1 Dec. 15, 2016

(51) Int. Cl.
*F16B 45/02* (2006.01)

(52) U.S. Cl.
CPC ......... *F16B 45/02* (2013.01); *Y10T 24/45277* (2015.01); *Y10T 24/45319* (2015.01); *Y10T 24/45335* (2015.01); *Y10T 24/45366* (2015.01); *Y10T 24/45372* (2015.01)

(58) Field of Classification Search
CPC .............. F16B 45/02; Y10T 24/45372; Y10T 24/45366; Y10T 24/45335; Y10T 24/45319; Y10T 24/45277
See application file for complete search history.

(56) References Cited

U.S. PATENT DOCUMENTS

| 6,588,076 | B1 * | 7/2003 | Choate | F16B 45/02 24/599.1 |
| 6,912,836 | B2 * | 7/2005 | Hsu | F16B 45/02 24/598.1 |
| 7,992,267 | B2 * | 8/2011 | Christianson | F16B 45/02 24/598.2 |
| 8,016,073 | B2 * | 9/2011 | Petzl | F16B 45/02 182/3 |
| 8,060,994 | B2 * | 11/2011 | Petzl | F16B 45/02 24/599.9 |
| 8,341,811 | B2 * | 1/2013 | Kim | A01K 75/00 24/588.1 |
| 8,474,112 | B2 * | 7/2013 | Thompson | F16B 45/02 24/582.11 |
| 8,763,216 | B2 * | 7/2014 | Codega | F16B 45/02 24/599.4 |
| 2003/0106190 | A1 * | 6/2003 | Christianson | F16B 45/02 24/600.1 |
| 2003/0167608 | A1 * | 9/2003 | Petzl | F16B 45/02 24/600.2 |
| 2004/0143945 | A1 * | 7/2004 | Christianson | F16B 45/02 24/600.1 |
| 2005/0246874 | A1 * | 11/2005 | Hsu | F16B 45/02 24/598.2 |
| 2008/0104810 | A1 * | 5/2008 | Liang | F16B 45/02 24/600.2 |

(Continued)

*Primary Examiner* — Robert J Sandy
*Assistant Examiner* — Louis Mercado

(57) ABSTRACT

A snap hook apparatus includes a shell, a bolt, a hook, two pins, a torsion spring and an elastic strip. The shell includes an annular rib formed on an internal side and teeth formed on the annular rib. The bolt includes two lugs, an annular shoulder, and a bore near the annular shoulder. The hook includes a catch at a first end and an aperture in a second end. The first pin is inserted in the first lug and used for engagement with the catch of the hook. The second pin is inserted in the second lug and the second end of the hook. The torsion spring includes a first end inserted in the bore of the bolt and a second end inserted in a recess defined between two adjacent ones of the teeth of the shell. The compression spring and the elastic strip are inserted in the shell.

4 Claims, 5 Drawing Sheets

(56) References Cited

U.S. PATENT DOCUMENTS

2010/0325848 A1\* 12/2010 Liang .................. F16B 45/02
                                                    24/598.3
2012/0011688 A1\*  1/2012 Yang ................... F16B 45/02
                                                    24/599.8
2015/0113774 A1\*  4/2015 Jang .................... F16B 45/02
                                                    24/599.6

\* cited by examiner

SNAP HOOK APPARATUS

BACKGROUND OF INVENTION

1. Field of Invention

The present invention relates to a snap hook apparatus and, more particularly, to a snap hook apparatus that provides easiness in assembling.

2. Related Prior Art

A conventional snap hook apparatus includes a shell, a hook, a bolt, two springs, and an elastic strip. The shell includes upper and lower notches, a slit in communication with the upper notch, and an annular shoulder formed on an internal side. The hook is a C-shaped element made with an aperture in an end. The bolt includes two orifices each made in a corresponding end, a bore made in a middle section, and an annular rib formed thereon near the aperture. The first spring is located on and around the middle section of the bolt. A first end of the first spring is inserted in the aperture of the bolt. A second end of the first spring is inserted in the slit as the bolt and the first spring are inserted in the shell. Thus, the first spring acts as a torsion spring. The second spring and the elastic strip are located against the bolt. A pin is inserted in the aperture of the hook and one of the orifices of the bolt. Thus, the hook is pivotally connected to the bolt. Another pin is inserted in the other orifice of the bolt. However, it is not easy to insert the second end of the first spring in the slit, which is narrow to precisely position the first spring. Moreover the shell could be broken from the slit when the conventional hook is moved downwardly time after time.

As disclosed in 2012/0011688 issued to Yang, another conventional snap hook apparatus includes a locking member 70, a hook 10, a pivotal gate 30, two springs 42 and 50, and a positioning member 43. The locking member 70 is a tubular element that includes a notch 73 made in an end, an annular rib (not numbered) formed on an internal side, and a slit 72 made in the annular rib. The hook 10 is a C-shaped element that includes an orifice 16 made in an end and a catch 23 formed at another end. The pivotal gate 30 includes an orifice (not numbered) transversely made in an end, an aperture 36 made in a middle section, and an annular shoulder 34 formed thereon near the aperture 36. The spring 50 is located around the middle section of the pivotal gate 30. A first end of the spring 50 is inserted in the aperture 36 of the pivotal gate 30. A second end of the spring 50 is inserted in the slit 72 as the pivotal gate 30 and the spring 50 are inserted in the locking member 70. Thus, the spring 50 acts as a torsion spring. The spring 42 and the positioning element 43 are located against the pivotal gate 30. A pin 40 is inserted in the orifice 16 of the hook 10 and the orifice of the pivotal gate 30. Thus, the hook 10 is pivotally connected to the pivotal gate 30. However, it is not easy to insert the second end of the spring 50 in the slit 73, which is narrow to precisely position the spring 50.

The present invention is therefore intended to obviate or at least alleviate the problems encountered in prior art.

SUMMARY OF INVENTION

It is the primary objective of the present invention to provide a snap hook apparatus that provides easiness in assembling.

To achieve the foregoing objective, the snap hook apparatus includes a shell, a bolt, a hook, two pins, a torsion spring and an elastic strip. The shell includes two notches respectively made in two ends, an annular rib formed on an internal side, and teeth formed on a side of the annular rib. The bolt includes a first lug formed at an end, a second lug formed at another end, an annular shoulder formed thereon, and a bore made in the vicinity of the annular shoulder. The hook includes a catch formed at a first end and an aperture made in a second end. The first pin is inserted in the first lug of the bolt and used for engagement with the catch of the hook. The second pin is inserted in the second lug of the bolt and the second end of the hook. The torsion spring includes a first end inserted in the bore of the bolt and a second end inserted in a recess defined by and between two adjacent ones of the teeth of the shell. A compression spring and the elastic strip are inserted in the shell.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
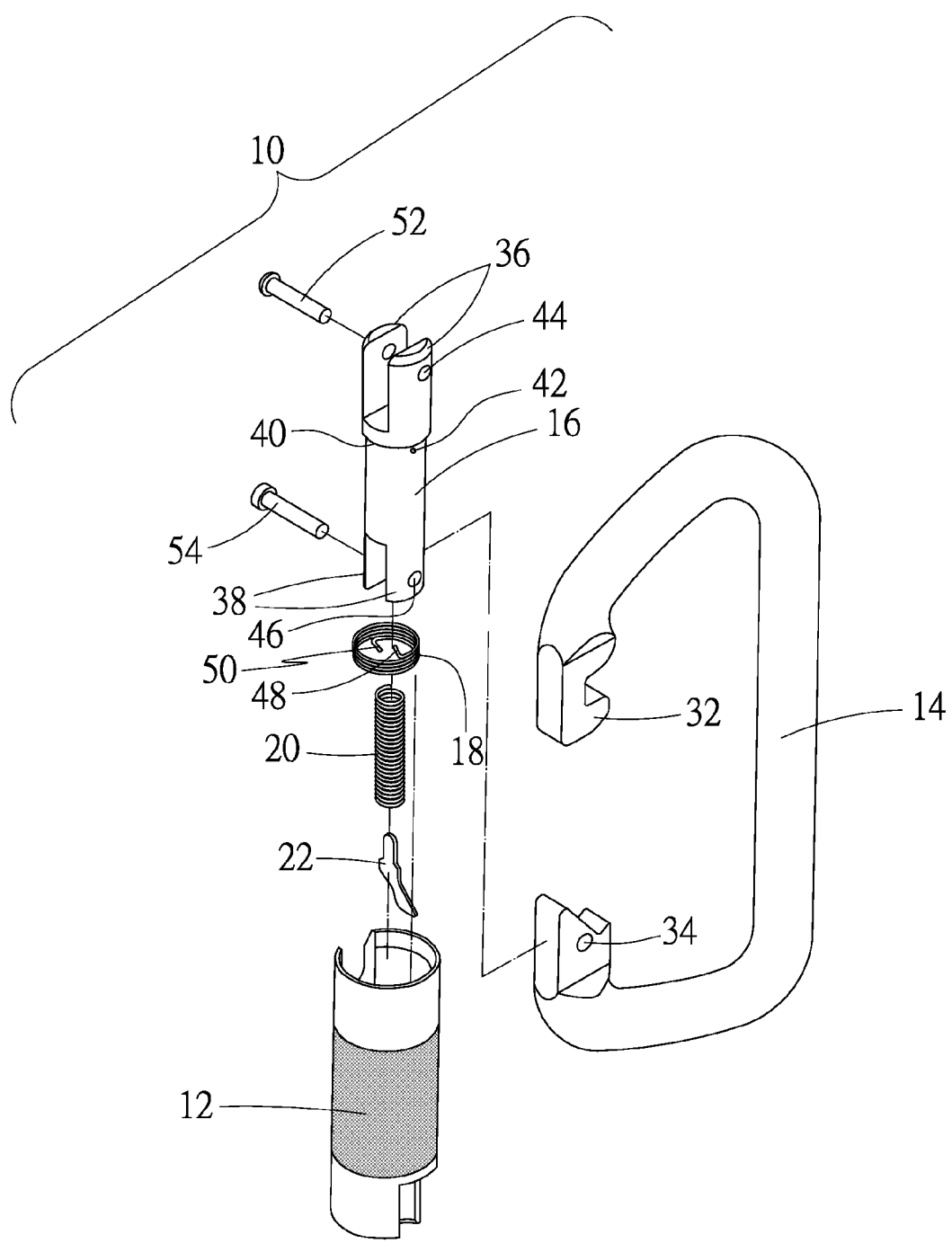
FIG. 1 is an exploded view of a snap hook apparatus according to the preferred embodiment of the present invention.

Referring to FIGS. 1 through 5, there is a snap hook apparatus 10 according to the preferred embodiment of the present invention. The snap hook apparatus 10 includes a shell 12, a hook 14, a bolt 16, two springs 18 and 20 and an elastic strip 22.

Figure 2:
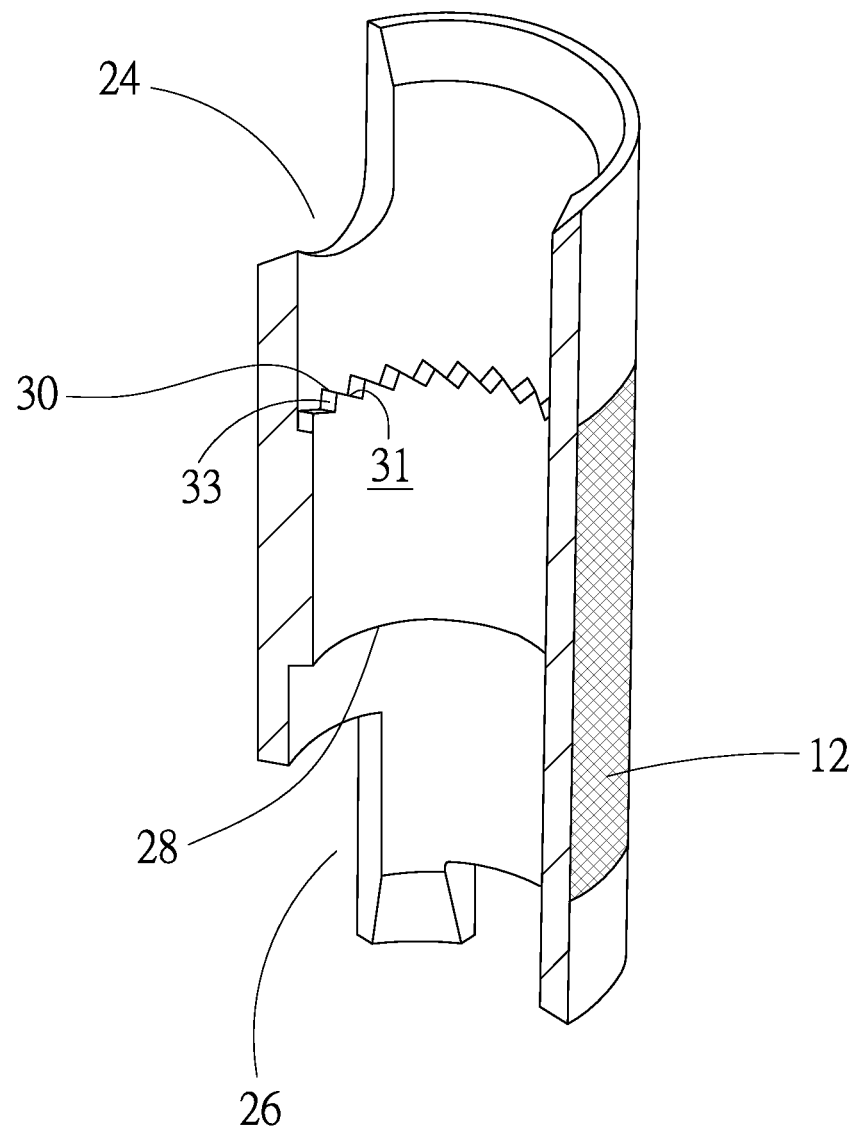
FIG. 2 is a cut-away view of a shell used in the snap hook apparatus shown in FIG. 1.

Referring to FIG. 2 in particular, the shell 12 is a tubular element that includes upper and lower notches 24 and 26 respectively made in upper and lower ends, an annular rib 28 formed on an internal side, and teeth 30 formed on an upper edge or side of the annular rib 28. Preferably, each of the teeth 30 is a ratchet tooth that includes a slope 31 and a vertical facet 33. However, each of the teeth 30 can be formed with two slopes in another embodiment.

The hook 14 is a C-shaped element that includes a catch 32 formed at an upper end and an aperture 34 made in a lower end. The catch 32 is in the form of a barb formed beside a recess made in the upper end.

The bolt 16 includes two parallel lugs 36 extending from an upper end, two parallel lugs 38 extending from a lower end, an annular shoulder 40 formed thereon, and a bore 42 made in the vicinity of the annular shoulder 40. Each of the lugs 36 is made with an aperture 44. Each of the lugs 38 is made with an aperture 46.

The spring 18 is in the form of a coil that extending around an axis. The spring 18 includes a first end 48 substantially extending in a radial manner and a second end 50 substantially extending in a slant manner relative to the axis of the spring 18.

Figure 3:
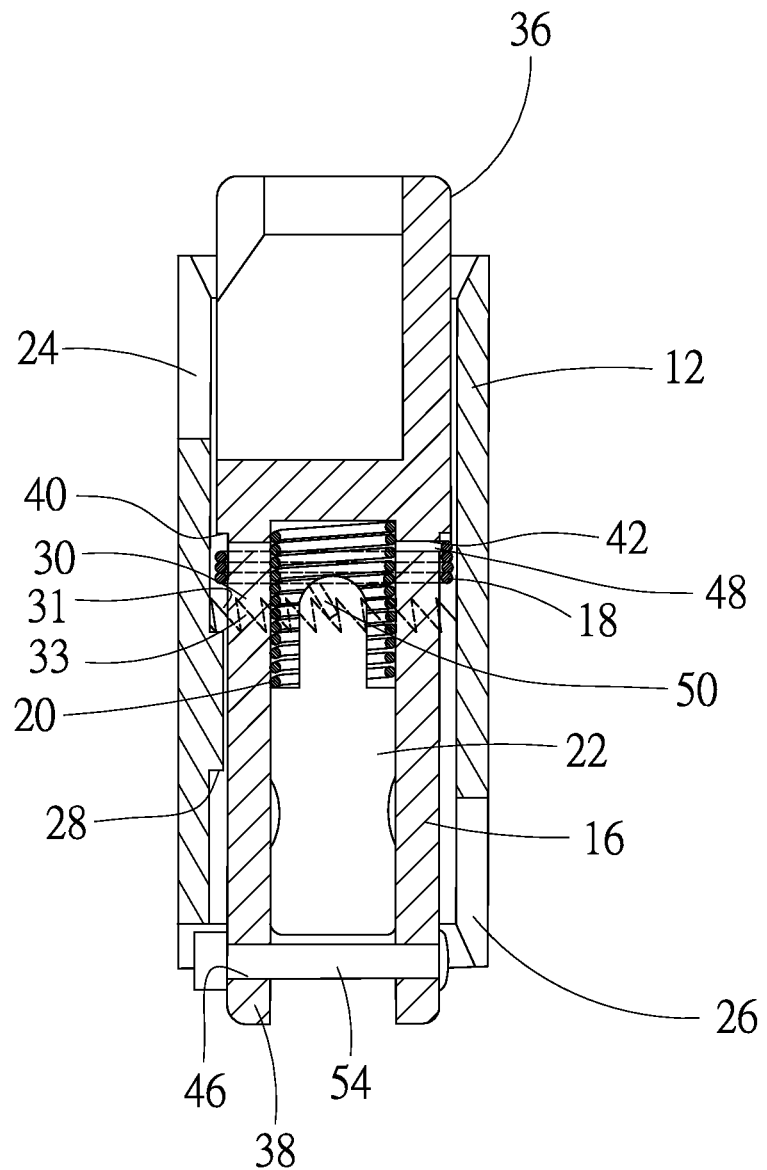
FIG. 3 is a cross-sectional view of the snap hook apparatus shown in FIG. 1.
Figure 4:
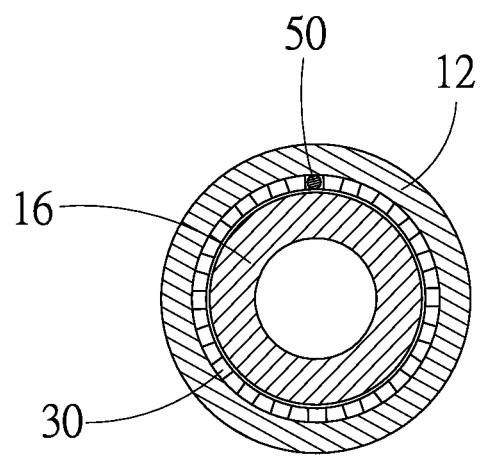
FIG. 4 is another cross-sectional view of the snap hook apparatus shown illustrated in FIG. 1.
Figure 5:
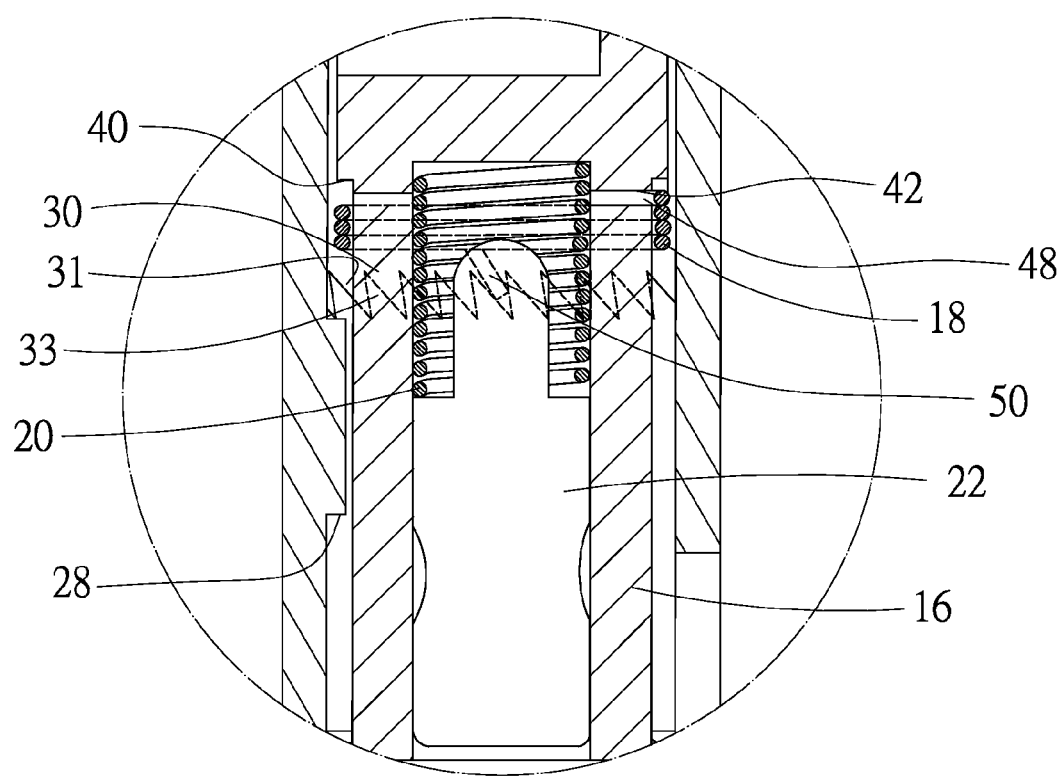
FIG. 5 is an enlarged partial view of the snap hook apparatus shown illustrated in FIG. 3.

Referring to FIGS. 3 through 5 in particular, the spring 18 is located on and around the middle section of the bolt 16.

The first end 48 of the spring 18 is inserted in the bore 42 of the bolt 16. The second end 50 of the spring 18 inserted in a recess defined by and between the slope 31 of one of the teeth 30 and the vertical facet 33 of an adjacent tooth 30. The second end 50 of the spring 18 is located against the vertical facet 33. Thus, the spring 18 acts as a torsion spring.

The spring 20 and the elastic strip 22 are located against the bolt 16. A pin 52 is inserted in the apertures 46 of the lugs 38 of the bolt 16 and the aperture 34 of the hook 14 after the lower end of the hook 14 is located between the lugs 38 of the bolt 16. Thus, the hook 14 is pivotally connected to the bolt 16. Another pin 54 is inserted in the apertures 44 of the lugs 36 of the bolt 16. The pin 54 can be engaged with the catch 32 of the hook 14.

The snap hook apparatus 10 exhibits at least two advantages over the prior art. Firstly, the shell 12 is robust because it is not made with any slit for receiving the second end 50 of the spring 18. Secondly, the assembly of the snap hook apparatus 10 is easy since the second end 50 of the spring 18 is smoothly guided into the recess defined by and between the slope 31 of any of the teeth 30 and the vertical facet 33 of an adjacent tooth 30 by the slope 31.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A snap hook apparatus comprising:
   a shell including an annular rib formed on an internal side and teeth formed on a side of the annular rib;
   a bolt including a first lug formed at an end, a second lug formed at another end, an annular shoulder formed thereon, and a bore near the annular shoulder;
   a hook including a catch formed at a first end and an aperture made in a second end;
   a first pin inserted in the first lug of the bolt and used for engagement with the catch of the hook;
   a second pin inserted in the second lug of the bolt and the second end of the hook;
   a torsion spring including a first end inserted in the bore of the bolt and a second end inserted in a recess between two adjacent ones of the teeth of the shell;
   a compression spring inserted in the shell; and
   an elastic strip inserted in the shell.

2. The snap hook apparatus according to claim 1, wherein the teeth are ratchet teeth.

3. A snap hook apparatus comprising:
   a shell including an annular rib formed on an internal side and teeth formed on a side of the annular rib;
   a bolt including a first pair of lugs formed at an end, a second pair of lugs formed at another end, an annular shoulder formed thereon, and a bore near the annular shoulder;
   a hook including a catch formed at a first end located between the first pair of lugs and an aperture made in a second end located between the second pair of lugs;
   a first pin inserted in the first pair of lugs of the bolt and used for engagement with the catch of the hook;
   a second pin inserted in the second pair of lugs of the bolt and the second end of the hook;
   a torsion spring including a first end inserted in the bore of the bolt and a second end inserted in a recess between two adjacent ones of the teeth of the shell;
   a compression spring inserted in the shell; and
   an elastic strip inserted in the shell.

4. The snap hook apparatus according to claim 3, wherein the teeth are ratchet teeth.

* * * * *